US007413511B2

(12) United States Patent
Seelig et al.

(10) Patent No.: US 7,413,511 B2
(45) Date of Patent: Aug. 19, 2008

(54) GAMING MACHINE WITH ACTION UNIT CONTAINER

(75) Inventors: Jerald C. Seelig, Absecon, NJ (US); Lawrence M. Henshaw, Hammonton, NJ (US)

(73) Assignee: Atlantic CIty Coin & Slot Service Company, Inc., Pleasantville, NJ (US)

( * ) Notice: Subject to any disclaimer, the term of this patent is extended or adjusted under 35 U.S.C. 154(b) by 490 days.

(21) Appl. No.: 10/937,018

(22) Filed: Sep. 9, 2004

(65) Prior Publication Data

US 2005/0037831 A1 Feb. 17, 2005

Related U.S. Application Data

(63) Continuation-in-part of application No. 10/245,532, filed on Sep. 16, 2002, now Pat. No. 6,860,809.

(60) Provisional application No. 60/503,312, filed on Sep. 15, 2003.

(51) Int. Cl.
*A63F 13/00* (2006.01)

(52) U.S. Cl. ............................ 463/22; 463/17; 463/18; 463/20; 273/144 R; 273/144 B; 273/143 R; 273/138.2

(58) Field of Classification Search ............. 273/144 R, 273/144 B, 144 A, 143 R, 138.1, 138.2; 463/17–20, 463/22, 46
See application file for complete search history.

(56) References Cited

U.S. PATENT DOCUMENTS

| | | | | |
|---|---|---|---|---|
| 4,871,171 | A | 10/1989 | Rivero | |
| 5,062,635 | A * | 11/1991 | Tse et al. | 273/144 A |
| 5,088,737 | A | 2/1992 | Frank et al. | |
| 5,380,007 | A | 1/1995 | Travis et al. | |
| 6,322,071 | B1 * | 11/2001 | Chaaban | 273/138.4 |

* cited by examiner

*Primary Examiner*—Benjamin Layno
(74) *Attorney, Agent, or Firm*—Ian F. Burns & Associates

(57) ABSTRACT

A gaming device having a container with at least one moveable object located within, one or more game elements capable of receiving and isolating the moveable objects, an actuator configured to attract the moveable objects to receptacle game elements, a game apparatus enabling a player to play the game, and a controller configured to determine a random game outcome and subsequently cause the actuator to move the objects to a game element to display the result of the game, is disclosed. Preferably, the actuator may be a magnet or a suction device, such as a fan, vacuum pump or vent. Display devices which include a container, moveable objects located within, one or more game elements, a suitable actuator to attract the moveable objects into or onto the receptacle game elements, and a controller associated with the actuator, are also disclosed. Further, a method of playing a game involving placing a wager using the game device described above is disclosed.

41 Claims, 12 Drawing Sheets

GAMING MACHINE WITH ACTION UNIT CONTAINER

CROSS REFERENCES TO RELATED APPLICATIONS

This application is a continuation-in-part application of U.S. patent application Ser. No. 10/245,532, filed Sep. 16, 2002, now issued as U.S. Pat. No. 6,860,809. The present application also claims priority of U.S. provisional patent application No. 60/503,312, filed on Sep. 15, 2003. All of the above referenced applications are hereby expressly incorporated by reference in their entireties.

FIELD OF INVENTION

The present invention relates to a display device for use with a gaming device that may select one or more moveable objects to convey a game outcome.

BACKGROUND

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices also tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds.

Keno

Upon an initial examination, it would appear to the applicants that the display device of Keno is an excellent choice for a display device for gaming devices. Keno is well known to the playing public, and it utilizes a highly visible and attractive display device. The display device comprises a container with a plurality of numbered balls. The balls in the container are agitated or jumbled, usually by a jet of air, to a state where they ricochet off of the walls of the container.

In the game of Keno, players select numbers that may be drawn from the Keno display device. The display device jumbles or mixes numbered balls in the container and then draws a predetermined number of balls from the container. Players are paid based on the number of balls drawn from the display device that match the numbers they selected.

However, before the present invention, the Keno display device has been unsuitable for use with gaming devices. One of the reasons this is so is because Keno is susceptible to environmental influences. As the balls are jumbled in the Keno ball device, static electricity, dust, and contaminants build up on the balls. This may cause the balls to stick to each other or to components in the display device thereby influencing the randomness of the game. Furthermore, the balls used in Keno displays may have slightly different weights or sizes that subtly affect the outcome of the game. An important aspect of any gaming device is resistance to environmental influences that could affect the results of the game.

Another reason the game of Keno has been unsuitable as an indicator for a gaming device is that it requires a great deal of human involvement. In many Keno games, human operators are required to read the numbers of the Keno balls as they are selected and input the numbers into a computer or display. Furthermore, operators must regularly clean the Keno balls and the Keno devices to keep dust and contaminants from building up on the balls. Not only does this require excessive human involvement for an automated gaming device (the greater the human involvement, the greater the cost of operating the game), the game is also susceptible to tampering and cheating.

Because of their susceptibility to environmental influences and tampering and their dependence on human operators and maintenance personnel, Keno games are not allowed in at least one major gaming jurisdiction. Furthermore, these disadvantages have prevented Keno display devices and other devices that use jumbled balls from being modified for use with gaming devices. The applicants have discovered that what has long been needed is a way for configuring jumbled ball display devices for use with gaming devices. Although reference is made to the game of Keno, it is to be understood that the present invention may be used with almost any type of ball, jumbled ball, or action unit display device, such as lottery balls, for example.

Bingo

Similar to Keno, some Bingo game devices utilize a container with a plurality of numbered balls. The balls in the container are agitated or jumbled, usually by rotation of the container. Players receive cards with a grid of cells or spaces. A randomly determined number of symbols is printed in each cell. As balls are randomly drawn from the container, players mark cells on their cards when the numbers on the ball correspond to numbers in the cell. The first player to fill a column, row, or diagonal line on the card with marks, wins the game. Although Bingo devices are well known and provide an attractive display, they suffer from the same problems as Keno devices. Therefore, before the present invention, they have not been considered acceptable for use with gaming devices.

Jumbled Ball Displays

The use of jumbled displays is described in U.S. Pat. No. 4,871,171 issued to Rivero and U.S. Pat. No. 5,380,007 issued to Travis et al. Rivero appears to disclose a game device with means for simulating the release of a ball, wherein a rotating drum is provided with numbered balls and as the drum rotates, a ball is released into a transparent tube. However, Rivero is not intended to show the player the ball that is released from the drum. Rather, the ball is held in the tube, out of view of the player, and an electronic simulation of the ball number is presented in a window. This is intended to give the player "the impression" that the ball has been counted. Rivero does not disclose nor suggest displaying actual balls to the player to indicate the outcome of the game or the value of a prize. In addition, in the Rivero device the balls are in a cage and quite exposed to the environment and the potential for tampering. The ball cage of Rivero is also mounted on the front side and well below the top of the gaming machine, hiding the ball cage from view of potential game players who are not in position to see the front side of the machine.

Travis et al. appears to disclose a video lottery gaming device with numbered balls. However, all of the balls are simulations generated by software and no physical balls are actually displayed to the player. Travis et al. also does not disclose nor suggest displaying actual balls to the player to indicate the outcome of the game or the value of a prize.

One of the disadvantages with Rivero and Travis et al. is that no actual physical balls are used to display the outcome of a game. This is not desirable because players prefer to see physical objects rather than electronic simulations of the physical objects. Moreover, players tend to believe that a game device is misleading when the device purports to display a simulation of an object rather than the object itself. This is especially true when the object itself is supposedly available for viewing, as is the case in Rivero.

U.S. Pat. No. 5,088,737 issued to Frank et al. appears to disclose a lottery machine where a player pre-selects a number and is able to view a plurality of indicia-bearing balls being air-mixed and the subsequent settling of a limited number of balls into ball-holding pockets where optoelectronic identification is used to compare the indicia on the settled indicia-bearing balls to the player's pre-selected number in order to determine if a match (prize) has been attained. One of the disadvantages of Frank et al. is that the device is subject to environmental contamination from static electricity, dust and other contaminants that accumulate on the surface of the balls which may cause the balls to stick to other balls or surfaces in the device and consequently affect the randomness of the game outcome, in this case, which balls settle into the ball-holding pockets.

SUMMARY OF ONE EMBODIMENT OF THE INVENTION

Advantages of One or More Embodiments of the Present Invention

The various embodiments of the present invention may, but do not necessarily, achieve one or more of the following advantages:

provide a display device utilizing moveable objects;

the ability to convey a random game outcome by selectively positioning moveable display objects in receptacles;

provide a decreased susceptibility to the effects of environmental contamination from static electricity, dust and other contaminants that may negatively affect the randomness of game results;

provide a decreased susceptibility to tampering and cheating during play of the game resulting in a fair game outcome as perceived by the game player;

provide a visual display that attracts the attention of potential game players to the game device; and provide a visual display that is entertaining and maintains the excitement and enjoyment experienced by players while playing the game by configuring the games to produce low probability events from which large prizes may be awarded.

These and other advantages may be realized by reference to the remaining portions of the specification, claims, and abstract.

Brief Description of One Embodiment of the Present Invention

Certain embodiments of the present invention are directed to gaming devices, comprising a container having at least one moveable object located therein. A game element, for example, a receptacle, is provided that is capable of receiving the moveable object. The gaming device includes an actuator configured to attract the moveable object to the game element. The gaming device includes a controller configured to determine a random game outcome and cause the actuator to attract the moveable object to the game element and thereby convey the random game outcome to a player.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Various embodiments of the present invention are shown in the accompanying drawings wherein.

In the Detailed Description below, the applicants utilize various spatially orienting terms such as "upper," "lower," "horizontal," and "vertical." It is to be understood that these terms are used for ease of description of the preferred embodiments with respect to the drawings but are not necessarily in themselves limiting or requiring of an orientation as thereby described in the following Detailed Description.

DESCRIPTION OF CERTAIN EMBODIMENTS OF THE PRESENT INVENTION

Figure 1:
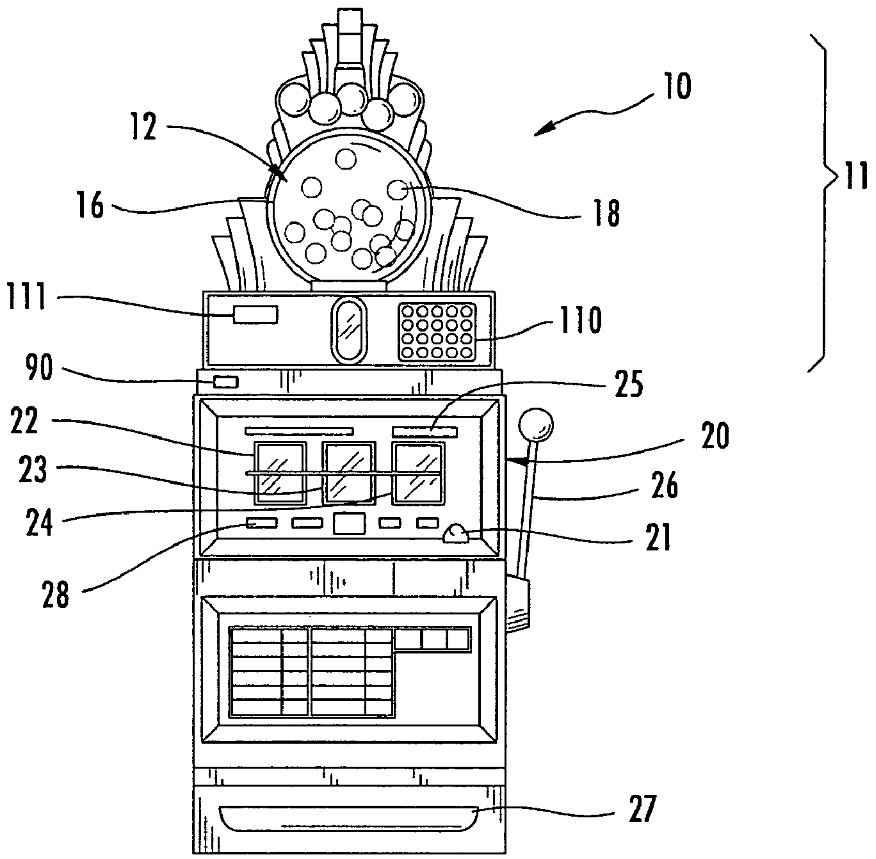
FIG. 1 is substantially a front view of a gaming device of the present invention.

As seen in FIG. 1, one embodiment disclosed herein comprises a gaming device, generally indicated by reference number 10. Gaming device 10 comprises a display device 11 and a game apparatus 20. Display device 11 may comprise a jumbled ball display 12.

Game Apparatus

With continuing reference to FIG. 1, game apparatus 20 may be any of a large number of devices that are configured to allow players to play a game. For example, game apparatus 20 may utilize reel displays, such as spinning reels 22-24 or a video display (not shown), to display outcomes of the game. Various devices may also be provided for accepting value from a player, such as a coin slot 21 or card reader 25, and for awarding prizes, such as a coin dispenser 27. A handle 26 and button 28 are provided for activating game apparatus 20 to begin a game. In at least one embodiment, game apparatus 20 maybe an S2000™ or S Plus™ model gaming device manufactured by International Game Technology in Reno, Nev.

Game apparatus 20 may be controlled by an electronic controller (not shown) that utilizes a random number generator. The random number generator produces a random or pseudo random number for each game. The outcome of the game may be determined by comparing the random number to a table of outcomes stored in a memory and accessed by the controller. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. The controller causes spinning reels 22-24 or the video display to show the outcome of the game that corresponds to the outcome of the random number generator. It is recognized that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

When a controller detects a bonus-activating event, it may begin a bonus sequence by activating display 110. Display 110 may comprise many different kinds of display devices, such as, for example, video screens, lights and light emitting diodes (LED). Display 110 may comprise its own controller that is configured to generate a variety of displays. Display 110 may further indicate that a player has qualified for a bonus round and prompt the player to perform an action. In one embodiment, the player is prompted to activate the bonus sequence by pressing input device 90, which may be a simple button, a keyboard or a touch screen display. In the case where a player must accumulate a number of bonus symbols to qualify for a bonus, display 110 may indicate the number of symbols that the player has received.

When the controller detects that input device 90 has been activated, the controller would activate an agitator in the jumbled ball display 12 (see discussion below); alternatively the agitator may begin automatically and input device 90 may be used to initiate the display sequence. It is understood that no input device may be used and the controller may automatically activate display 12 to begin a display sequence.

Prizes, including bonus awards, may be, for example, goods, services and additional games. Typically, goods and services may be awarded in the form of physical objects, tickets, vouchers and coupons; additional games may be presented in the form of tickets, such as scratch-off lottery tickets. In the case where tickets, vouchers and coupons are used, these maybe dispensed using an internally or externally mounted dispenser 111; such dispensers are well known in the art.

Jumbled Ball Display

With continuing reference to FIG. 1, jumbled ball display 12 comprises a container 16 that is configured to hold a plurality of moveable objects 18, such as lightweight balls. Container 16 is at least partially transparent allowing players to view moveable objects 18 inside of the container. Container 16 may be made of a transparent material, such as plastic or glass. In one embodiment, container 16 is made of acrylic polymer. Suitable containers of this type maybe obtained from Tripp Plastics of Reno, Nev. In another embodiment, container 16 may include an open mesh wire cage enclosed within, where moveable objects 18 are further constrained, and wherein the wire cage includes an opening to allow the moveable objects 18 access to game elements capable of receiving the moveable objects.

Container 16 may have many different shapes, including, for example a sphere, hemisphere, cube, cylinder, triangle and pyramid. In certain embodiments, container 16 is substantially spherical with a partially flat back (not shown). The flat back allows container 16 to be large while still allowing gaming device 10 to be conveniently placed against a wall, another gaming device or other objects.

Although moveable objects 18 may be similar to Keno balls, many other types of balls may be used. For example, moveable objects 18 may be ping-pong balls or rubber balls. Moveable objects 18 may be constructed from any suitable material. It is understood that the materials used to construct moveable objects 18 may affect the size, shape and movement characteristics of moveable objects 18. For example, the moveable objects may be of a first-type and a second-type, where the first- and second-types are each of different sizes or materials; consequently they may each have different movement characteristics. For example, some materials may tend to bounce or ricochet more than other materials. In addition, moveable objects 18 may be of any size desired by the game designer. Moveable objects 18 may be of various shapes. The shape of moveable objects 18 may also affect their movement properties. More than one size or type of moveable object can be placed within container 18.

Display 12 also may comprise, an agitator (not shown in FIG. 1) to agitate or jumble moveable objects 18 within container 16. The agitator maybe, for example, one or more of a stream of air, a mechanical mixing device and suction. The agitator may move the moveable objects inside container 16, perhaps causing the balls to bounce and ricochet off of the walls of container 16. In at least one embodiment, a stream of air is used as an agitator and container 16 comprises an off center opening for the stream of air. The opening is off center to increase the initial agitation of moveable objects 18.

Fins (not shown) may also be provided at the bottom of container 16 to help agitate moveable objects 18. The fins support moveable objects 18 when they are resting at the bottom of container 16 and also help air circulate to lift and separate moveable objects 18.

At least one purpose of jumbled ball display 12 is to attract and entertain players. When moveable objects 18 are agitated, they may produce a vivid display that may attract the attention of people nearby and provide an exciting display for players playing gaming device 10.

Jumbled ball display 12 may be filled with different media. Typically, the jumbled ball display is filled with air. However, other media, for example, carbon dioxide to give a smoky, shadowy appearance, and liquids, such as water and inert oils, may be used in order to create unique games and/or affect the movement characteristics of moveable objects 18.

Figure 2:
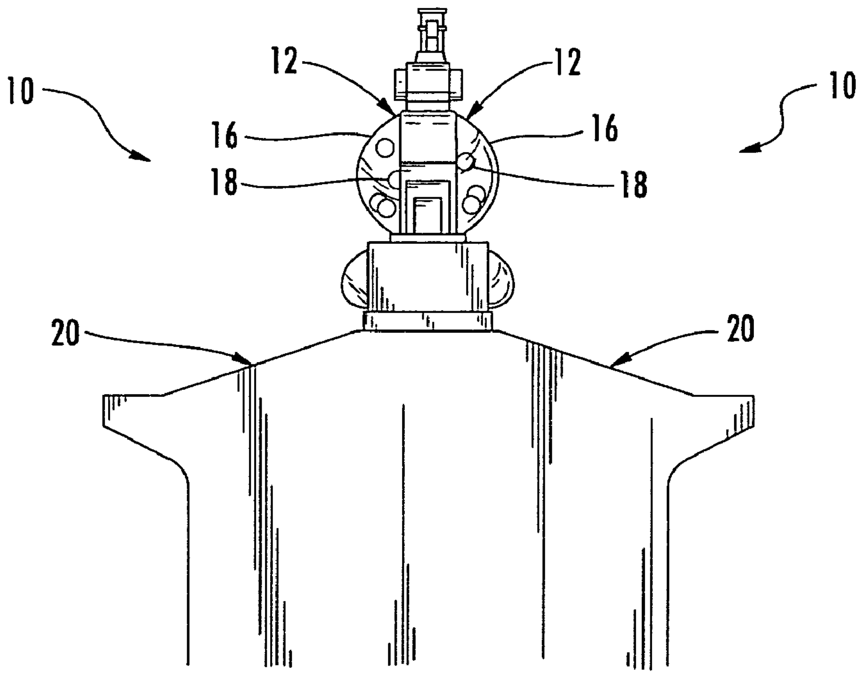
FIG. 2 is substantially a side view of an alternative embodiment of the gaming device of the present invention.

FIG. 2 represents an alternative embodiment of the present invention in which two gaming devices 10 are placed back to back. Each gaming device 10 comprises a game apparatus 20. Game apparatuses 20, shown in FIG. 2, are known as "slant top" devices for their sloping upper surfaces. However, other types of gaming devices, such as the upright game apparatus 20 shown in FIG. 1, may also be used.

In this embodiment, a separate jumbled ball display 12 is provided for each game apparatus 20. Each jumbled ball display 12 may comprise container 16 in the shape of a hemisphere. Containers 16 may be placed back to back so that the two containers have an overall spherical appearance when viewed from the side. Other shapes, such as cubes and cylinders, may also be used. A mirror may be placed at the back of each container 16 to enhance the appearance of the jumbled ball displays 12 by reflecting images of moveable objects 18 outward toward the players. Containers 16 may also be one single container that is divided in two by a mirror or other partition. Each container 16 has its own independently operated agitator and moveable objects 18.

Figure 3:
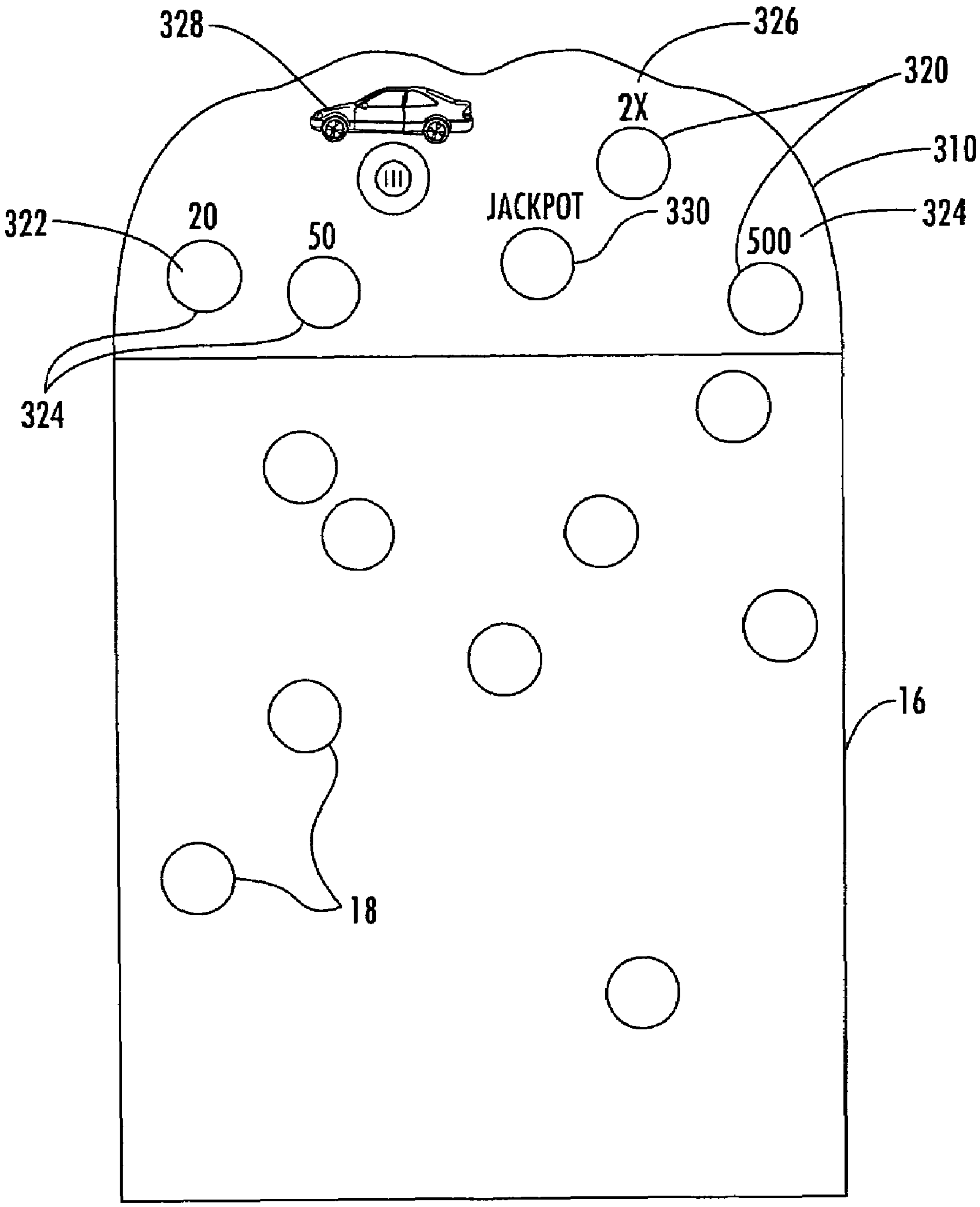
FIG. 3 is substantially a front view of a display device according to the present invention.

Moveable objects 18 may be used to indicate a game outcome. One embodiment is illustrated in FIG. 3. A plurality of moveable objects 18, shown as balls, are inside container 16. As illustrated, FIG. 3 includes a display area 310 having a plurality of game elements, indicated here as prize displays 320. Prize displays 320 may represent, without limitation, prizes 324, bonus multipliers 326, goods or services 328 (depicted as a car in FIG. 3), and jackpots 330 (including progressive jackpots).

In at least one embodiment, prize displays 320 comprise windows 322 into an interior area of display 310. During a game, a player's prize is indicated by a moveable object 18 appearing in one or more prize display prize window 322. For example, as illustrated in FIG. 3, a moveable object 18 is located in prize display 328, indicating that the player has won goods, such as a car.

More than one prize displays 320 may be used to indicate the outcome of a game. For example, in certain embodiments, a plurality of prizes 324 could be indicated. In other embodiments, at least one prize 324 and at least one multiplier 326 could be indicated, with the player receiving a prize equal to a mathematical combination (such as the product) of the indicated prizes 324 and the indicated multipliers 326.

Although display area 310 is illustrated in FIG. 3 as being located.at the upper portion of container 16, the display area could be located in other areas or additional display areas 310 could be located on other areas of container 16.

Moveable object detectors associated with game elements, and in communication with the controller, may be used to determine when a moveable object has been received by a game element; the game element may be configured to receive the moveable object on the surface of the game element. For example, sensors (not shown), such as optical, electrical or magnetic sensors, can be included to detect the presence of a moveable object 18 within prize display 320 (which may be a ball chamber, as shown, or a ball chute, hoop, ball receptacle, ball-container or other game element). Optical sensors may be used to determine the presence of a moveable object 18. Inductive sensors may also be used. An inductive sensor may be placed adjacent to a prize display 320. Moveable objects 18 may contain a magnetic or metallic substance. When a moveable object 18 is proximate to the inductive sensor, the metallic or magnetic substance in the ball may cause the inductance of the inductive sensor to change, thereby detecting that a moveable object 18 is indicating a prize. In addition, multiple objects may be proximate to a prize display and may be detected by the inductive sensor.

In other game play embodiments, it may be beneficial to know the exact identity of each moveable object 18 proximate to a sensor. Various systems can be used to identify each moveable object 18. For example, the inductance altering properties of moveable objects 18 may vary. A controller (not shown) may correlate a particular induction change to one or more particular moveable objects 18.

Other sensing mechanisms may be used, including optical sensors such as bar code scanners and the like. Other systems may employ unique semiconductors, or other items, located inside moveable objects 18. Suitable systems include those described in U.S. Pat. No. 5,799,940 to Tripp, which is hereby incorporated by reference. Unique transmitters, such as RFID (radio frequency identification) tags may also be placed inside moveable objects 18.

Figure 4:
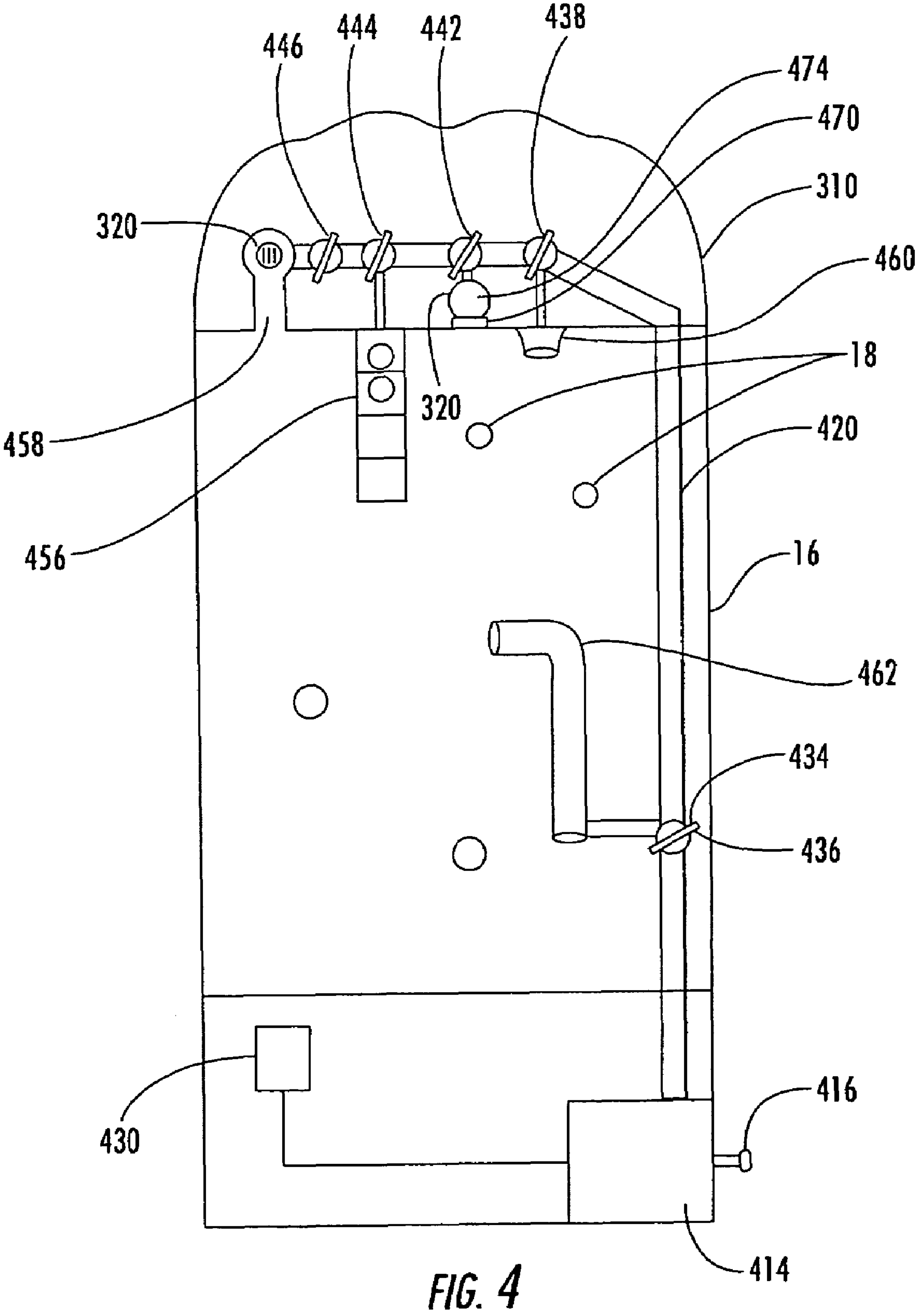
FIG. 4 is substantially a view of an apparatus for attracting moveable objects to selected game elements to indicate a game outcome for a display device of the present invention.

FIG. 4 illustrates one apparatus for attracting moveable objects 18 to selected game elements in order to display the randomly determined outcome of a game to a player. The components shown in FIG. 4 may be located at the rear of container 16 (see FIGS. 1 and 2), display area 310 (see FIG.

3), and gaming device 10 (see FIG. 2) in order to facilitate hiding the components from game players. It is understood that other arrangements are possible, such as placing some, or all of the components on a side, the top, or the bottom of container 16, among others. A variety of actuators can be used for attracting moveable objects 18 to selected game elements without departing from the scope of the present invention. Suitable actuators include, for example, suction devices and magnets. For example, in the case where moveable objects 18 maybe made of, coated with, or contain a magnetic substance, the selective activation of magnets (actuator) attracts the moveable object 18 to a specific receptacle game element.

FIG. 4 also illustrates one example of an actuator, in this case a suction device 414. Suction devices for use in the present invention include, for example, fans, vacuum pumps, pneumatic pressure differential and other suitable devices for creating suction. A vent 416 may be provided. If suction device 414 is a fan, the fan may blow air out of vent 416, thereby creating suction in suction tube 420. Vent 416 may also be used for exhaust when the suction device 414 is a vacuum pump. Alternatively, the suction device may take the form of vent (not shown) associated with a particular game element (receptacle) where there is positive pressure in the container; in this case there is no requirement for a fan as part of the actuator system.

Suction device 414 may be triggered by a controller 430. Controller 430 may the same as a controller for gaming device 10, for a bonus game, or may be a separate controller (that may be in communication with the controllers for a primary game and/or a bonus game). Controller 430 may also control the amount of suction produced by suction device 414.

Controller 430 may be in communication with one or more valves 434, such as valves 436, 438, 442, 444, and 446. Valves 434 may be electronic or mechanical and may be individually controllable. Valves may be located or placed between a game element and an actuator. In certain embodiments, the amount of suction through valves 434 in controllable. For example, it may be desirable to control the amount of suction applied to multi-object receptacle 456. The amount of suction may determine how many objects are held within multi-object receptacle 456. For example, more suction may be applied if four moveable objects 18 are to be held than if just one moveable object 18 is to be held in multi-object receptacle 456. FIG. 4 illustrates a multi-object receptacle holding two moveable objects 18, in this case, balls.

Valves 434 may be used to activate a plurality of game elements, such as receptacles 456, 460 and 462. The game elements can be activated individually, or more than one game element may be active simultaneously. That is, each game element may be selectively actuatable by a controller in communication with a particular actuator. For example, a game designer may wish to have a moveable object 18 sucked into an prize display 320 (through opening 458) while at the same time holding a moveable object 18 on object receptacle 460. It may be desirable to apply varying degrees of suction to different game elements. For example, more suction may be required to pull moveable objects 18 into object receptacle tube 462 than to hold a moveable object on object receptacle 460.

Controller 430 may be in communication with object control elements, such as gate 470. Gate 470 may be useful in preventing moveable objects 18 from entering or escaping certain game elements. For example, FIG. 4 shows gate 470 in a closed position, preventing moveable objects 18 from entering object chamber 474. Gate 470 may be in communication with controller 430 through a physical or wireless connection (not shown).

Figure 5:
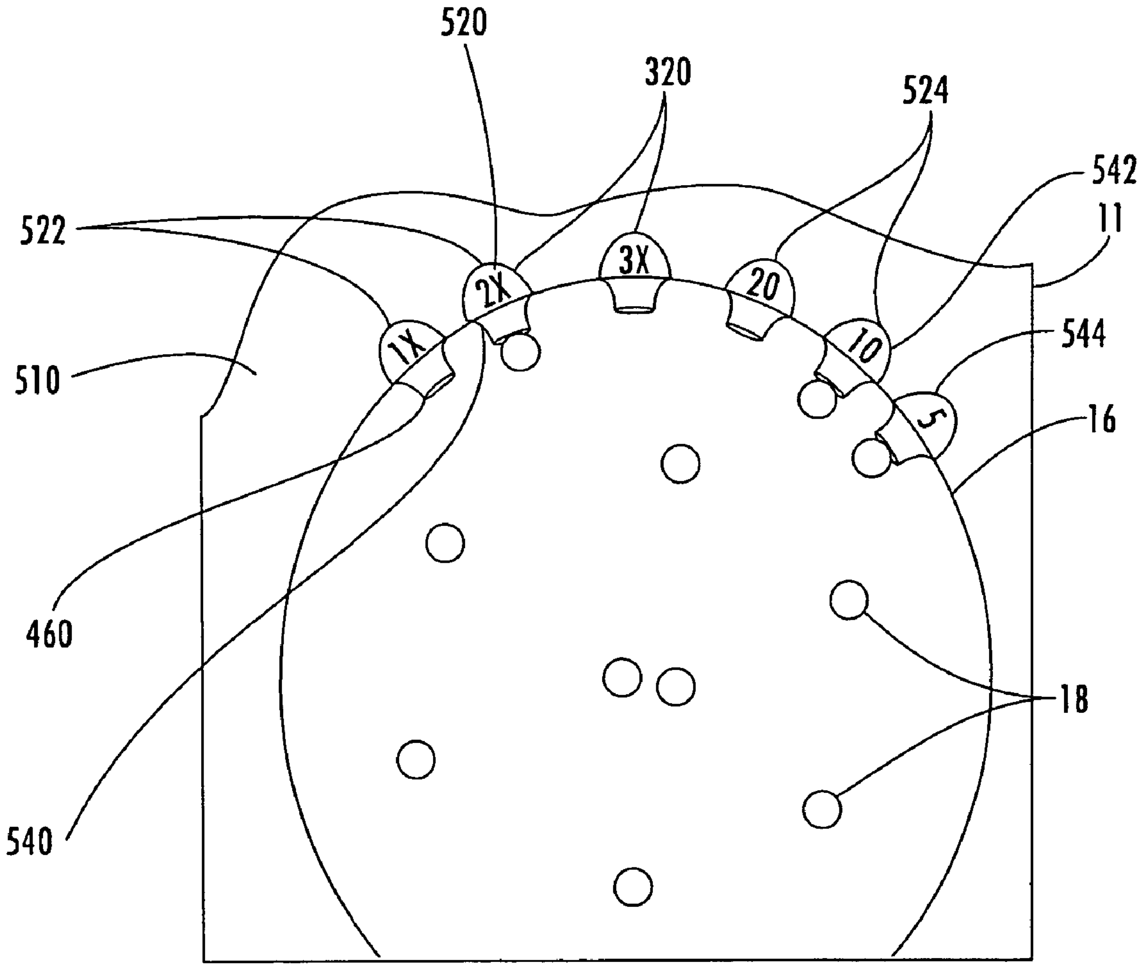
FIG. 5 is substantially a front view of a display device according to the present invention.

FIG. 5 illustrates one possible display device 11 of the present invention. Display device 11 may have a container 16 surrounded by a display housing 510. Display housing 510 may have a plurality of game elements, in this case prize displays 320. Prize displays 320 may bear game related indicia 520, or otherwise convey game related information such as multiplier amounts 522 or prize amounts 524.

Prize displays 320 may be associated with one or more game elements, such as object receptors 460 (see FIG. 4). Suction may be applied to selected object receptors 460 in order to convey a randomly determined game outcome. For example, when suction is applied to an object receptor, and an object is in contact with the object receptor, a prize may be awarded according to indicia on the prize display 320 associated with the activated object receptor 460.

As illustrated in FIG. 5, suction has been applied to game elements (object receptors) 540, 542, and 544. The indicia borne by the associated prize displays 320 may represent a multiplier of 2, a prize of 5 coins, and a prize of 10 coins. The player may be awarded a prize equal to the product of the multiplier and a mathematical combination of the prizes. For example, the player could be awarded the product of the multiplier and the sum of the coin prizes, or 30 coins. It is understood that any combination of multipliers and/or prizes could be awarded without departing from the scope of the present invention.

Figure 6:
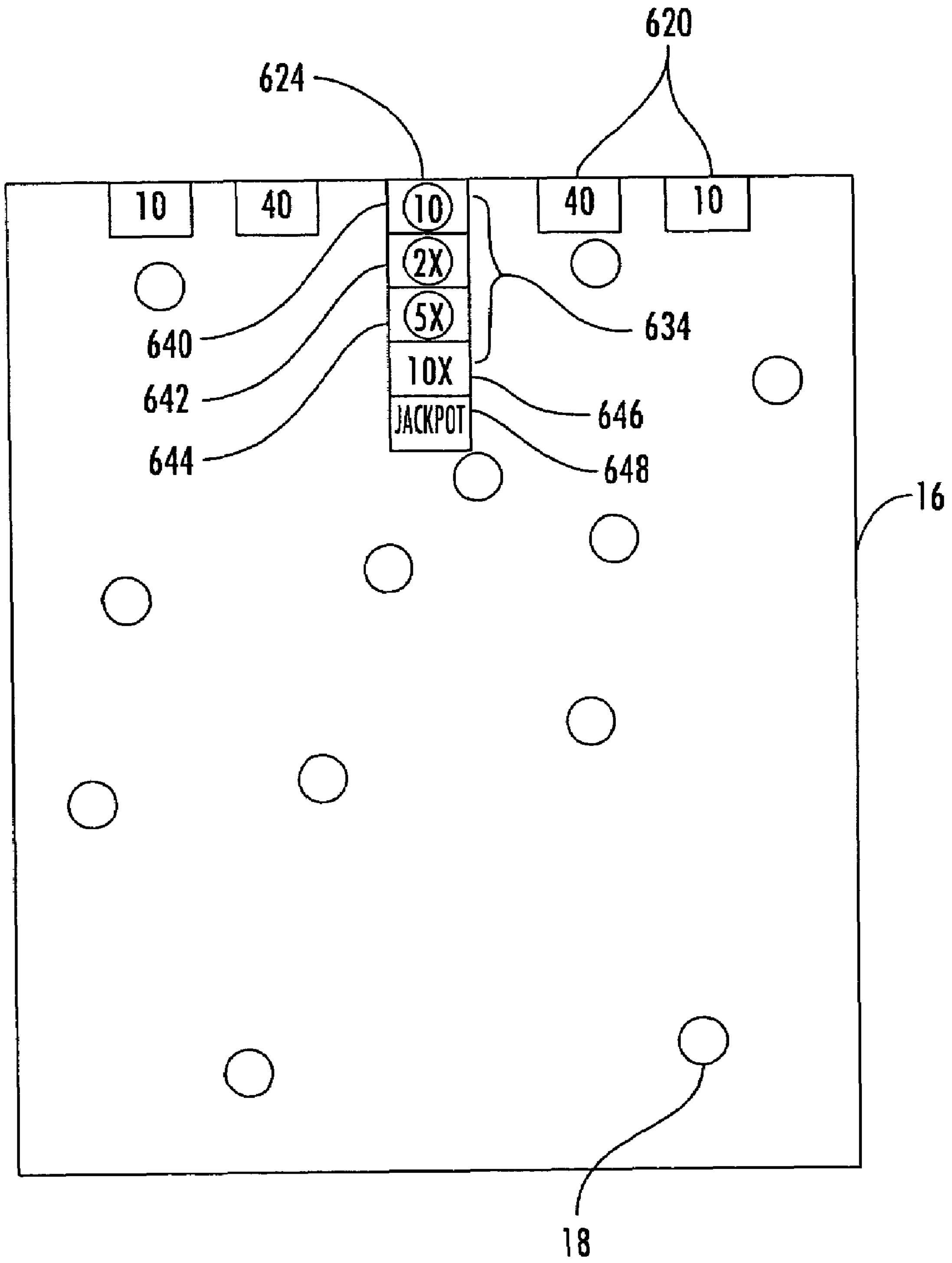
FIG. 6 is substantially a front view of a display device according to the present invention.

FIG. 6 illustrates another embodiment of a display device 11 of the present invention. FIG. 6 illustrates a multi-object holder 624 and a plurality of single-object holders 620. A plurality of moveable objects 18 may be present within container 16. A controller (not shown in FIG. 6) may determine a game outcome that may be indicated by the placement of moveable objects 18 inside single-object holders 620 and/or multi-object holder 624.

For example, FIG. 6 illustrates three moveable objects 18 within multi-object holder 624. Indicia 640, 642, and 644 may be present on segments (sections) 634 of multi-ball holder 624 containing moveable objects 18. Indicium 640 may represent a prize amount (such a number of coins or credits) while indicia 642 and 644 may represent multiplier amounts. Because indicium 644 represents a higher multiplier than indicia 642, indicia 644 could be awarded instead of indicia 642. Alternatively, the player could be awarded a multiplier of a mathematical combination of indicia 642 and 644. The multiplier could be multiplied by prize 640 or by other prizes.

Other prizes may be awarded, including higher multipliers (such as multiplier 646) and jackpot prizes (such as jackpot 648, which may be a progressive jackpot). The prize or prizes awarded may be controlled by the amount of suction applied to multi-object holder 624 and/or single-object holders 620. For example, applying greater suction to multi-object holder 624 may attract more moveable objects 18 into multi-object holder 624. The game outcome maybe indicated by a combination of multi-object holder 624 and one or more single-object holders 620. For example, multi-object holder 624 may determine a multiplier and single-object holders 620 may indicate a prize which will be multiplied by the multiplier.

Figure 7:
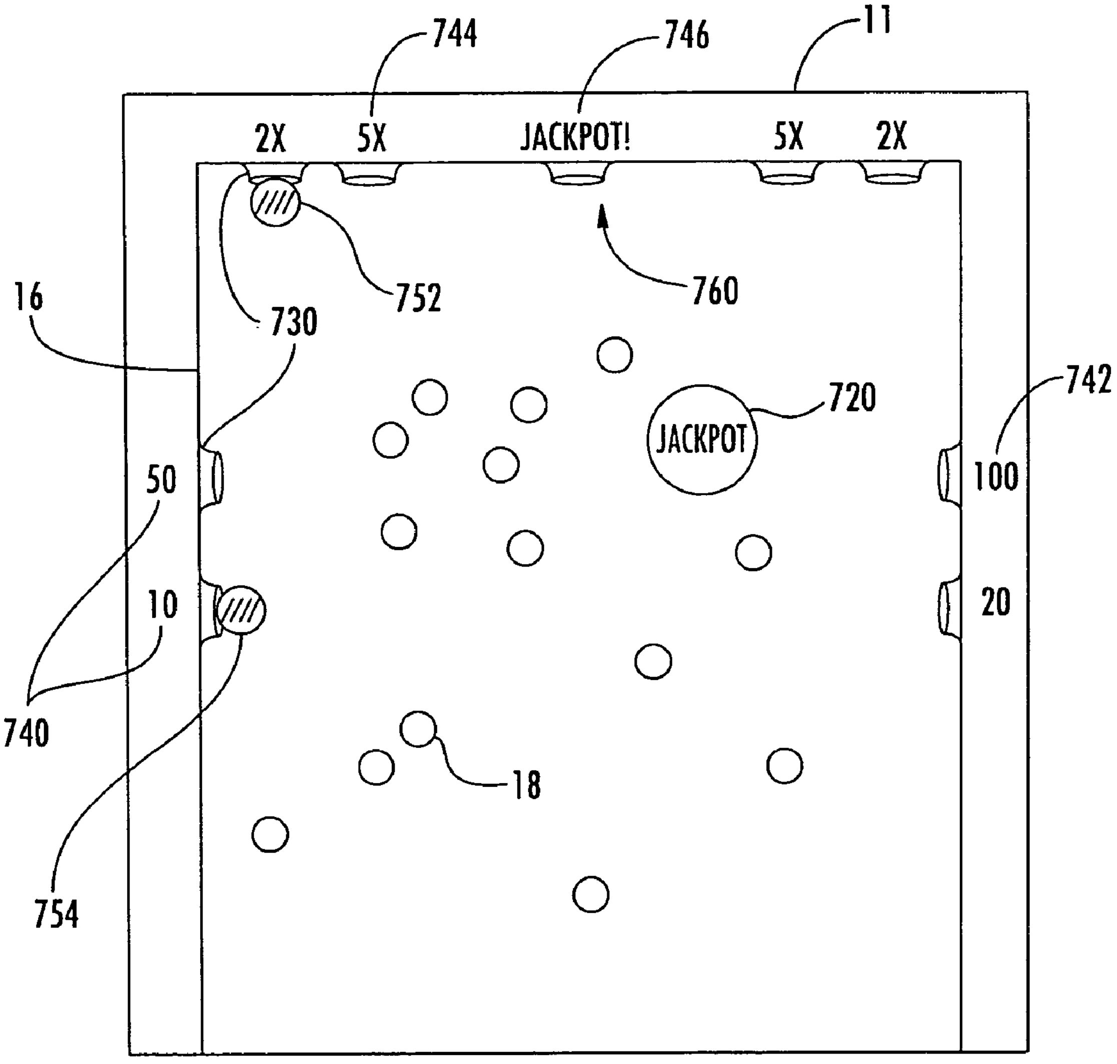
FIG. 7 is substantially a front view of a display device according to the present invention.

FIG. 7 illustrates an alternate embodiment of the present invention, again having a container 16 filled with a plurality of moveable objects 18. Container 16 may contain one or more differently sized or shaped moveable objects, such as jackpot object 720. Display device 11 is shown with a plurality of object receptors 730. However, other game elements, such as object chambers and object receptacles, may be used in place of, or in addition to, object receptors 730.

Game play may be similar to previously described embodiments where selective application of suction to object receptors 730 may convey a randomly determined game outcome. Indicia 740 may be placed on or proximate to object receptors 730 in order to convey the prize awarded by a particular object receptor 730. Indicia 740 may include, for example, prize amounts 742, multipliers 744, jackpot prizes 746, goods or services (not shown), free game play (not shown), and other prizes. FIG. 7 illustrates object receptors 752 and 754 being active. In the illustrated embodiment, the player may be awarded a prize equal to the multiplier represented by object receptor 752 and the prize amount of object receptor 754 (for a prize of 20 coins).

Using moveable objects 18 having different sizes, shapes, or movement characteristics may allow for additional flexibility in game design. For example, jackpot object 720 may be heavier than moveable objects 18. Accordingly, jackpot object 720 may require a larger object receptacle 760 in order for enough suction to be applied to attract and hold jackpot object 720.

In some cases, it is possible that moveable objects 18 will also be attracted to object receptacle 760, in addition to jackpot object 720. One solution to this issue may be to alter the movement characteristics of moveable objects 18 and/or jackpot object 720. For example, object receptacles 730 that are to hold moveable objects 18 may be located on lower portions of container 16. Object receptacle 760 may be placed on higher portions of container 16. Moveable objects 18 maybe constructed to bounce travel less highly in container 16 than jackpot object 720. In this way, it will be possible for jackpot object 720 to reach object receptacle 760, but not moveable objects 18.

Figure 8:
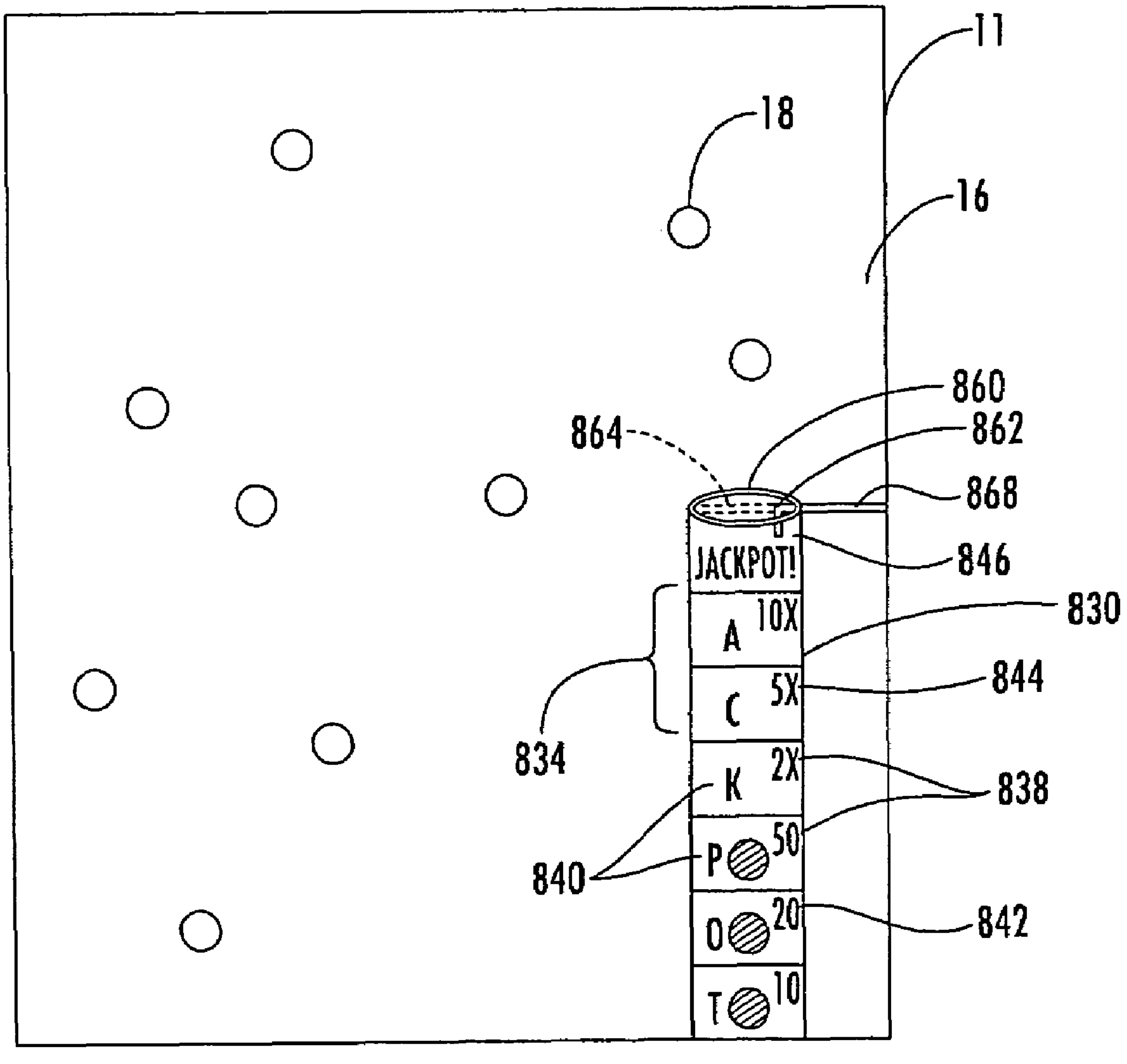
FIG. 8 is substantially a front view of a display device according to the present invention.

FIG. 8 illustrates another embodiment of the invention having a plurality of moveable objects 18 in container 16 of display device 11. Multi-object holder 830 may be provided to hold one or more moveable objects 18 to indicate prizes corresponding to a randomly determined game outcome.

Multi-object holder 830 may contain a plurality of segments 834, each segment being capable of receiving a moveable object. Segments 834 may have indicia 838 indicating prizes such as prize amounts 842, multipliers 844, and jackpot prizes 846. Additional indicia 840 may also be included. For example, as shown in FIG. 8, if enough moveable objects 18 fill multi-object holder 830, "Jackpot" may be spelled out and a player may be entitled to a jackpot prize.

Moveable objects 18 may be attracted to multi-object holder 830 using suction, as previously described. Alternatively, moveable objects 18 may simply be agitated within container 16, or placed in motion above multi-object holder 830, such that moveable objects 18 will occasionally enter multi-object holder 830 on their own accord.

It may desirable to ensure that no more moveable objects 18 enter multi-object holder 830 than are required to indicate a randomly determined game outcome. While agitation or other motion of moveable objects 18 can be ceased once the game outcome is achieved, there maybe the possibility of stray moveable objects 18 entering multi-object holder 830 (or other game elements, when present).

A gate 862 maybe activated to cover (that is, limit access to) the opening 860 of multi-object holder 830 when the game outcome has been indicated. Gate 862 is shown in FIG. 8 in an inactive position. The active position is indicated by dashed lines 864. Gate 862 may be in communication with a controller (not shown), such as by connection 868 or other means.

Figure 9:
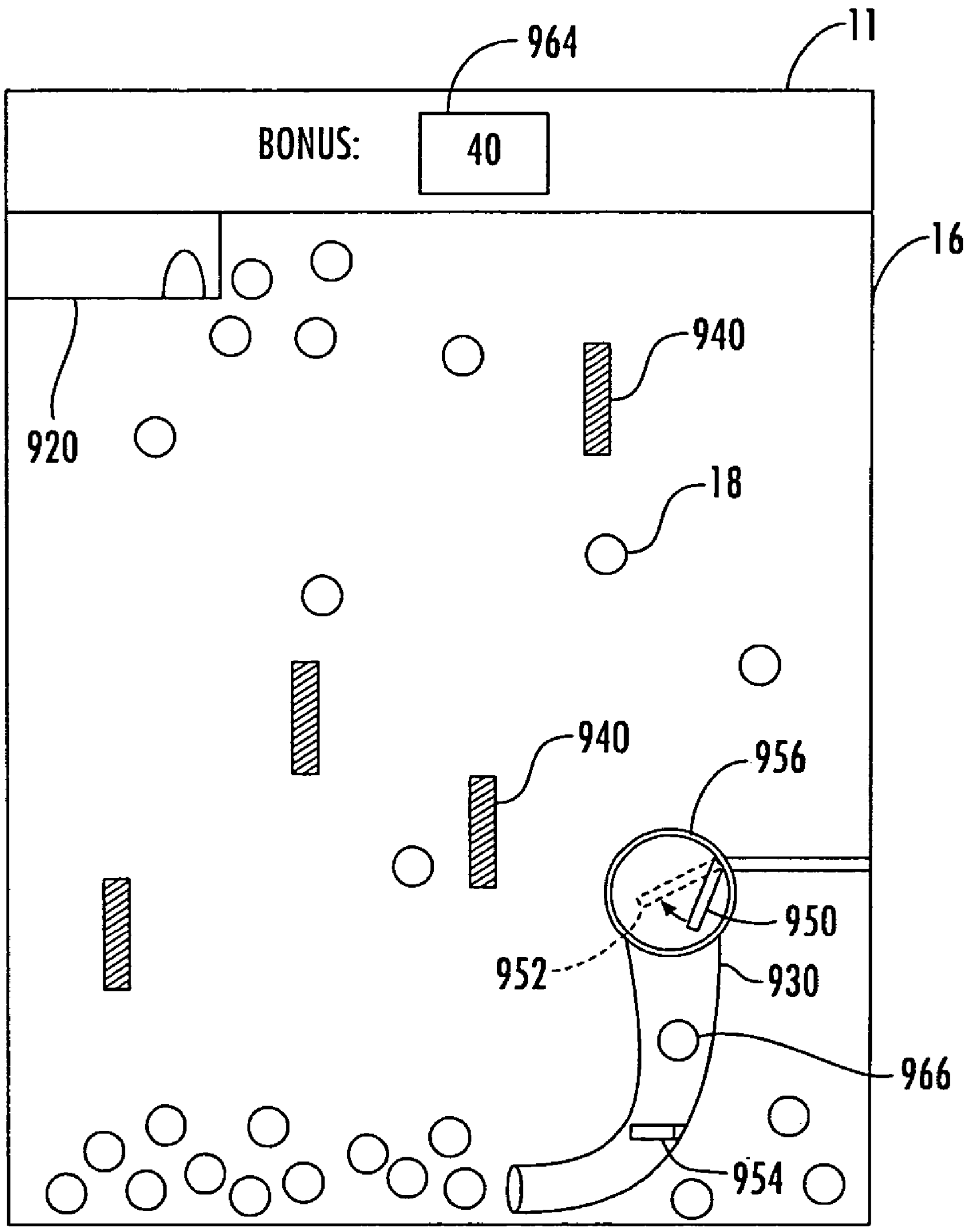
FIG. 9 is substantially a front view of a display device according to the present invention.

FIG. 9 illustrates another embodiment of the invention. A plurality of moveable objects 18 may be introduced into container 16 of display device 11 through an object dispenser 920. Object dispenser 920 may release moveable objects 18 above the height of a game element, such as object receptacle chute 930. Moveable objects 18 may be collected at the bottom of container 16 and returned to object dispenser 920. The bottom of container 16 may be sloped and funnel-shaped to feed moveable objects into an object return mechanism (not shown). In an alternate configuration, the bottom of container 16 could be covered by a grate (not shown) through which moveable objects 18 may pass and enter the object return mechanism.

Various object return mechanisms may be used to transport moveable objects from lower portions of the container to the moveable object dispenser without departing from the scope of the present invention. For example, a conveyer belt type system could be employed. The conveyer belt might have one or more tracks, scoops, buckets, or other means for carrying moveable objects 18 from the bottom of container 16 to object dispenser 920.

Alternatively, a waterwheel type mechanism could be used. The waterwheel may have a series of groves or compartments that may scoop up moveable objects 18 from the lower part of container 16 and carry them as the wheel rotates to an upper portion of container 16 for delivery to object dispenser 920. The waterwheel maybe configured to feed moveable objects 18 directly into object dispenser 920. Alternatively, the waterwheel mechanism may feed moveable objects 18 into a delivery system that will convey moveable objects 18 to object dispenser 920. For example, moveable objects 18 may be dropped onto a slide or funnel that utilizes gravity to feed moveable objects 18 into object dispenser 920.

Another suitable object return mechanism maybe an auger (not shown). Moveable objects 18 may be directed to the auger, which may have channeled spirals to better hold moveable objects 18. As the auger rotates, moveable objects 18 will be carried upwards towards the top of container 16. At the top of container 16, moveable objects 18 may be directed into a slide, funnel, or similar mechanism for delivery to object dispenser 920. It is understood that the present invention is not limited to any particular object dispenser or object transport mechanism. Any suitable known, or later developed, object dispenser 920 and/or object transport mechanism may be used without departing from the scope of the present invention.

Once moveable objects 18 have been released from object dispenser 920, they may fall to the lower portion of container 16, perhaps entering object receptacle chute 930 of their own accord. Alternatively, moveable objects 18 maybe attracted to object receptacle chute 930 using suction, as previously described. A variety of barriers 940 may be included in container 16. Barriers 940 may be made from any suitable material, such as plastic and acrylic polymer. The inclusion of barriers 940 may make for a more interesting display because some moveable objects 18 may strike barriers 940 and ricochet in various directions.

Object receptacle chute 930 maybe equipped with a gate 950 that maybe moved to position 952, as previously described with regard to FIG. 8, in order to prevent moveable objects 18 from entering the game element. Gate 950 may be activated (for example, by a controller) once a game outcome is achieved and it is desired that no more moveable objects 18 are allowed to enter object receptacle chute 930.

In certain embodiments, a random game outcome is determined and conveyed to the player by the number of moveable objects 18 passing into and through object receptacle chute 930. As moveable objects 18 pass through object chute 930, they may actuate a counter 954. Counter 954 may be in communication with a controller so that a gaming device can determine when the game outcome has been conveyed, activate gate 950, and deactivate object dispenser 920. Counter 954 may also be in communication with a display area 964 that may display the game outcome to the player.

In one embodiment, all of moveable objects 18 may represent the same value, perhaps 10 credits. The random game outcome may be a number of credits. Display device 11 may be activated until a sufficient number of moveable objects 18 have passed through object chute 930 to indicate the game outcome.

In FIG. 9, display 964 indicates a current bonus amount of 40 credits. Moveable object 966 is shown in object receptacle chute 930, but has not yet triggered counter 954. Typically, gate 950 will be closed immediately after a controller senses that a predetermined number of objects have entered the game element. For example, if the random game outcome were 50 coins, gate 950 would be activated as soon as moveable object 966 triggers counter 954. Display 964 would be updated to display "50" and display device 11 would be deactivated.

It is understood that other game elements can be used instead of object receptacle chute 930. For example, a hoop 956 could be used. At least one advantage of object receptacle chute 930 may be to assist players in determining the prize they will receive. Moveable objects 18 may move more slowly, and/or be more visible, when in object chute 930, potentially making it easier for player to see the game outcome.

Figure 10A:
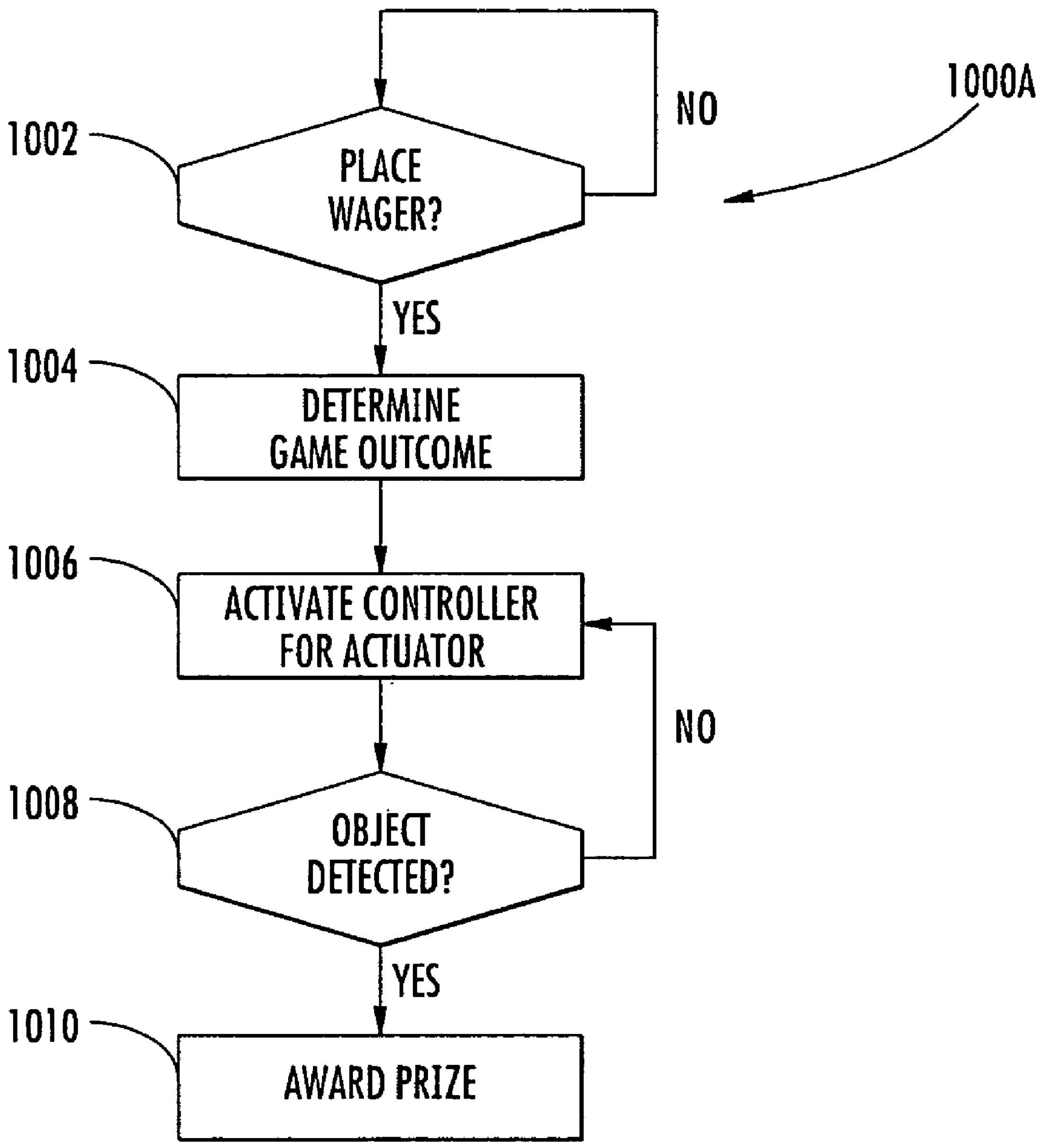
FIGS. 10A and 10B are exemplary flowcharts illustrating a method of operation, such as playing a game, according to the present invention.

FIG. 10A provides a flowchart for a method of operation 1000A, for example, playing a game, of the present invention, generally applicable to embodiments shown in FIGS. 3 through 7 (using FIG. 4 as a reference). At decision step 1002, game apparatus 20 determines whether a player has placed a wager. If the player has not placed a wager, method 1000A loops back to decision step 1002 until a wager is placed. Once a wager is placed, method 1000A proceeds to step 1004 where a game outcome is determined.

At step 1006, a controller is activated for an actuator that corresponds to the game outcome determined in step 1004. For example, controller 430 may trigger suction device 414 (FIG. 4). At decision step 1008, method 1000A checks to see if any moveable objects 18 have been detected by a game element, such as object receptacles 456, 460 or 463, for example. If an object is detected, method 1000A proceeds to step 1010 and awards a prize(s) as determined by the selected game outcome in step 1004.

At decision step 1008, if an object 18 is not detected by an appropriate object receptacle, method 1000A loops back to step 1006 and game apparatus 20 continues to activate controllers for actuators corresponding to the predetermined game outcome.

Figure 10B:
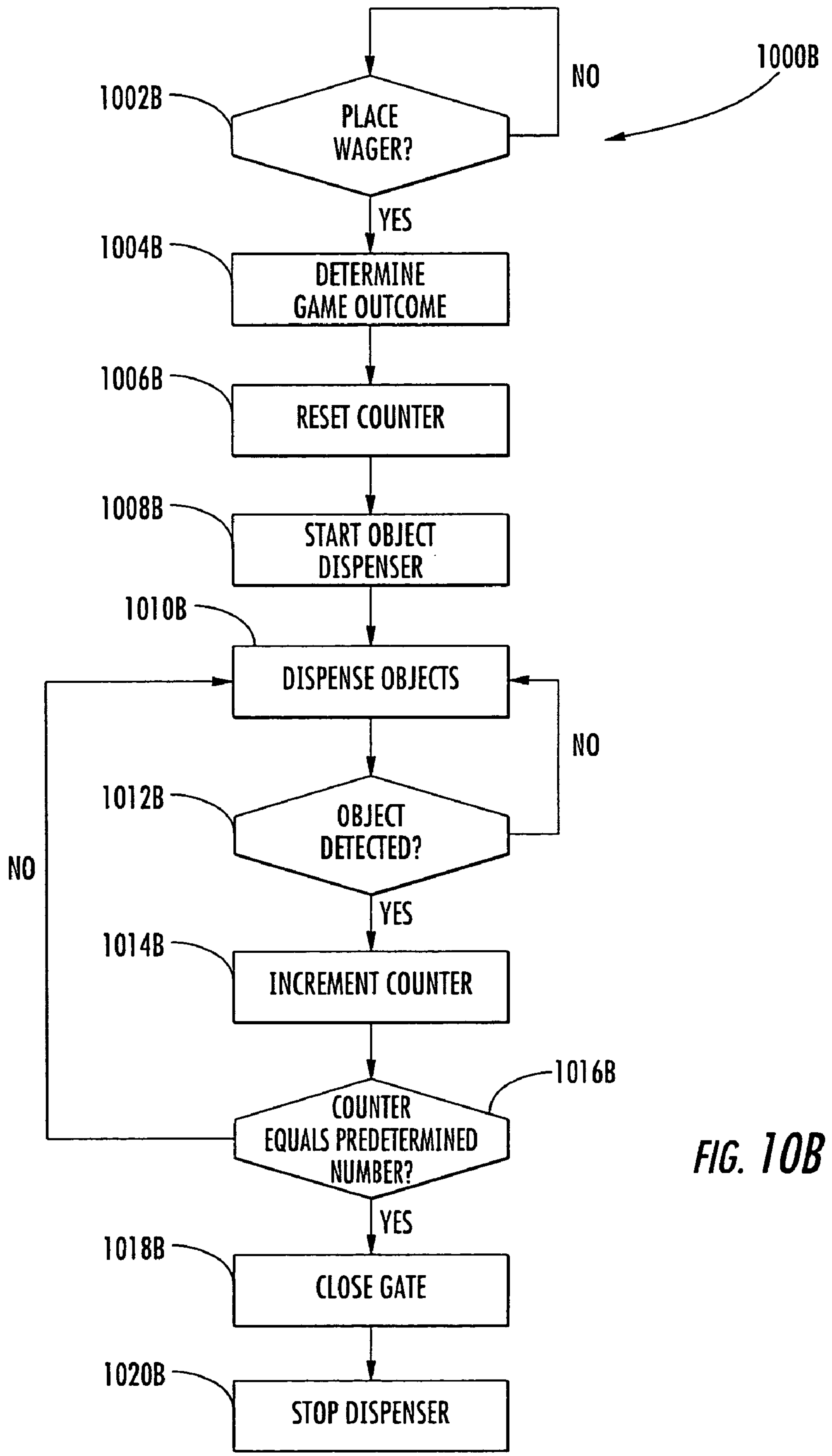

FIG. 10B provides a flowchart for another method of operation 1000B of the present invention using FIG. 9 as a reference. At decision step 1002B, game apparatus 20 determines whether a player has placed a wager. If the player has not placed a wager, method 1000B loops back to decision step 1002B until a wager is placed. Once a wager is placed, method 1000B proceeds to step 1004B where a game outcome is determined.

At step 1006B, a counter maybe reset, followed by activation of object dispenser 920 at step 1008B. At step 1010B moveable objects 18 are dispensed from object dispenser 920. At decision step 1012B, method 1000B checks to see if any moveable objects 18 have been detected by a game element, such as object receptacle chute 930. If an object is detected, method 1000B proceeds to step 1014B and increments the counter. Method 1000B proceeds to decision 1016B where game apparatus 20 checks to see if the counter value is equivalent to the game outcome determined in step 1004B.

At decision step 1016B, if the counter value is not equivalent to the game outcome determined in step 1004B, method 1000B loops back to step 1010B and game apparatus 20 continues to dispense moveable objects 18. If, at decision step 1016B, it is determined that the counter is equivalent to the game outcome determined at step 1004B, method 1000B proceeds to step 1018B and closes gate 950 to prevent additional moveable objects 18 from entering the game element. Method 1000B then proceeds to step 1020B and stops the object dispenser 920 from dispensing additional moveable objects 18.

Figure 11:
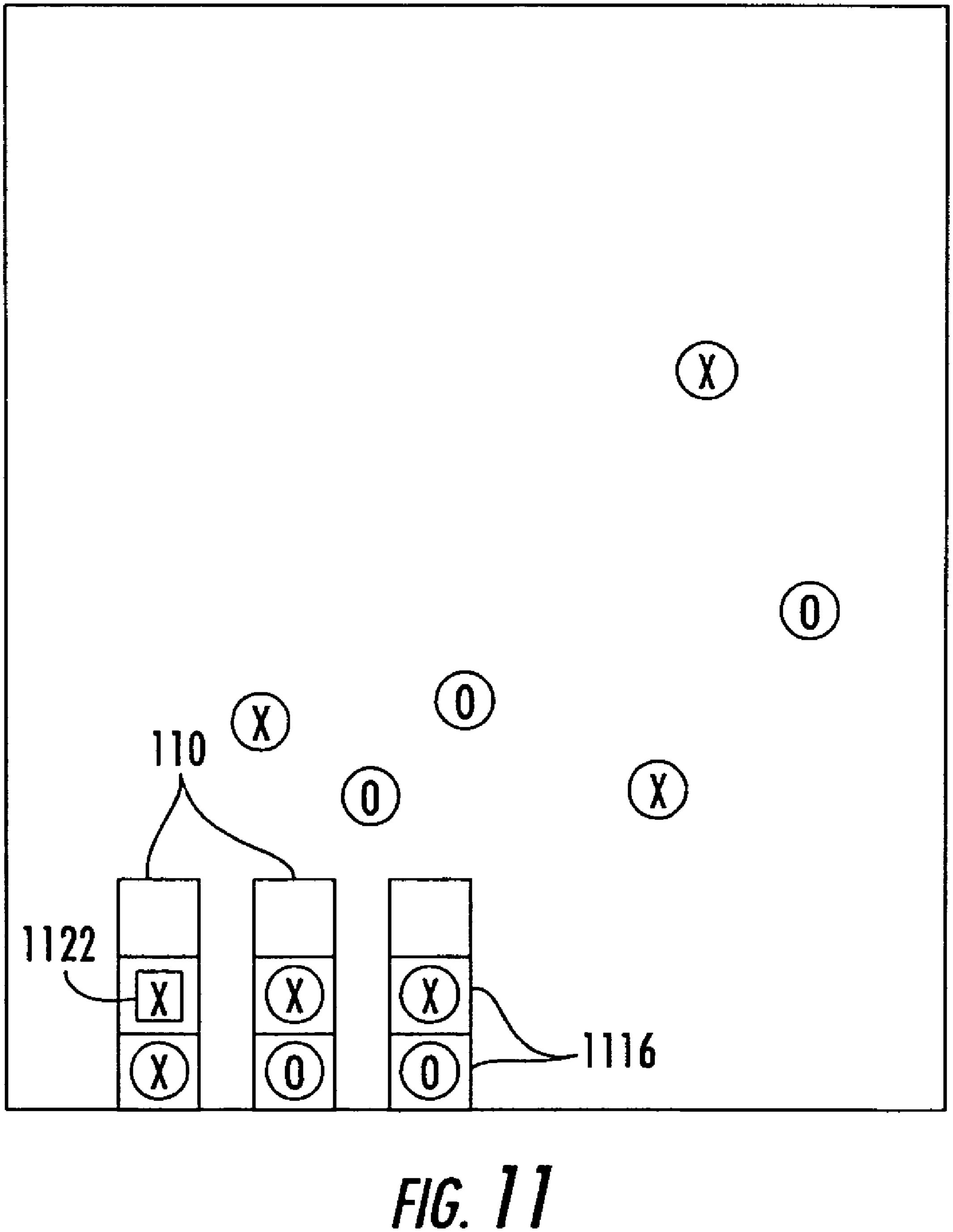
FIG. 11 is substantially a front view of a display device according to the present invention.

Another embodiment of the invention is illustrated in FIG. 11, where a combination of moveable objects determines or conveys a game outcome. FIG. 11 depicts a game, such as tic-tac-toe where a winning combination is obtained when a row, column, or diagonal of a matrix is filled with all of the same symbols. Such a game may be carried out in a number of ways. For example, the moveable objects 18 may bear indicia and may be selectively directed into one of the receptacle game elements 1110. In this way, a random game outcome maybe conveyed by selectively directing the desired moveable objects 18 into the appropriate receptacles 1110. Indicia (symbols) on moveable objects 18 that are useful in determining the game outcome can be identified by sensors, such as those previously mentioned, for example, optical scanners, electrical or magnetic sensors, inductive sensors as well as RFID (radio frequency identification) devices.

In other embodiments, segments 1116 of receptacles 1110 maybe marked with symbols, with winning combinations depending on which segment moveable objects 18 enter. The game may be timed, or the number of moveable objects is limited, in order to allow different combinations of symbols to be achieved. Additionally, the game itself may limit how long the game lasts. For example, a game might end when a row or column is filled, or when a certain number of symbols have been selected. It is understood that the present invention is not limited to a tic-tac-toe game, but is applicable to games in general.

In another embodiment, moveable objects 18 may enter a game element, such as object receptacles 1110, and at least one indicium is displayed after the ball enters receptacle 1110. Using tic-tac-toe as an example, each segment 1116 maybe capable of displaying an X or O. For example, the segment could have a display 1122 for displaying game indicia. Additionally, receptacle 1110 and/or segment 1116 could be made from a material on or through which light can be transmitted to display appropriate indicia.

In this embodiment, there are several potential sources of control over the game outcome. First, moveable objects 18 may be selectively attracted to specific game elements, such as object receptacle 1110, by application of suction (or other actuator devices). Alternatively, moveable objects 18 may be randomly agitated and enter object receptacle 1110 of their own accord. Accordingly, while the game displayed to the player may appear random to the player, it actually may be controlled by a game controller and the game carried out to convey a randomly determined game outcome.

Another element of control maybe added by displaying indicia to the player after the moveable object enters the game element. In this way, the player may think that the position of the moveable object affects the game outcome, even though the outcome actually may be controlled by selectively displaying indicia on the displays 1122.

These elements of control may be used alone or in combination. For example, in certain embodiments, moveable objects 18 may be allowed to randomly enter the game elements, because the game outcome may be selectively displayed by displays 1122. Similarly, in other embodiments, the player may be allowed to control which game element a ball enters with the game controller controlling the game outcome shown on displays 1122.

Figure 12:
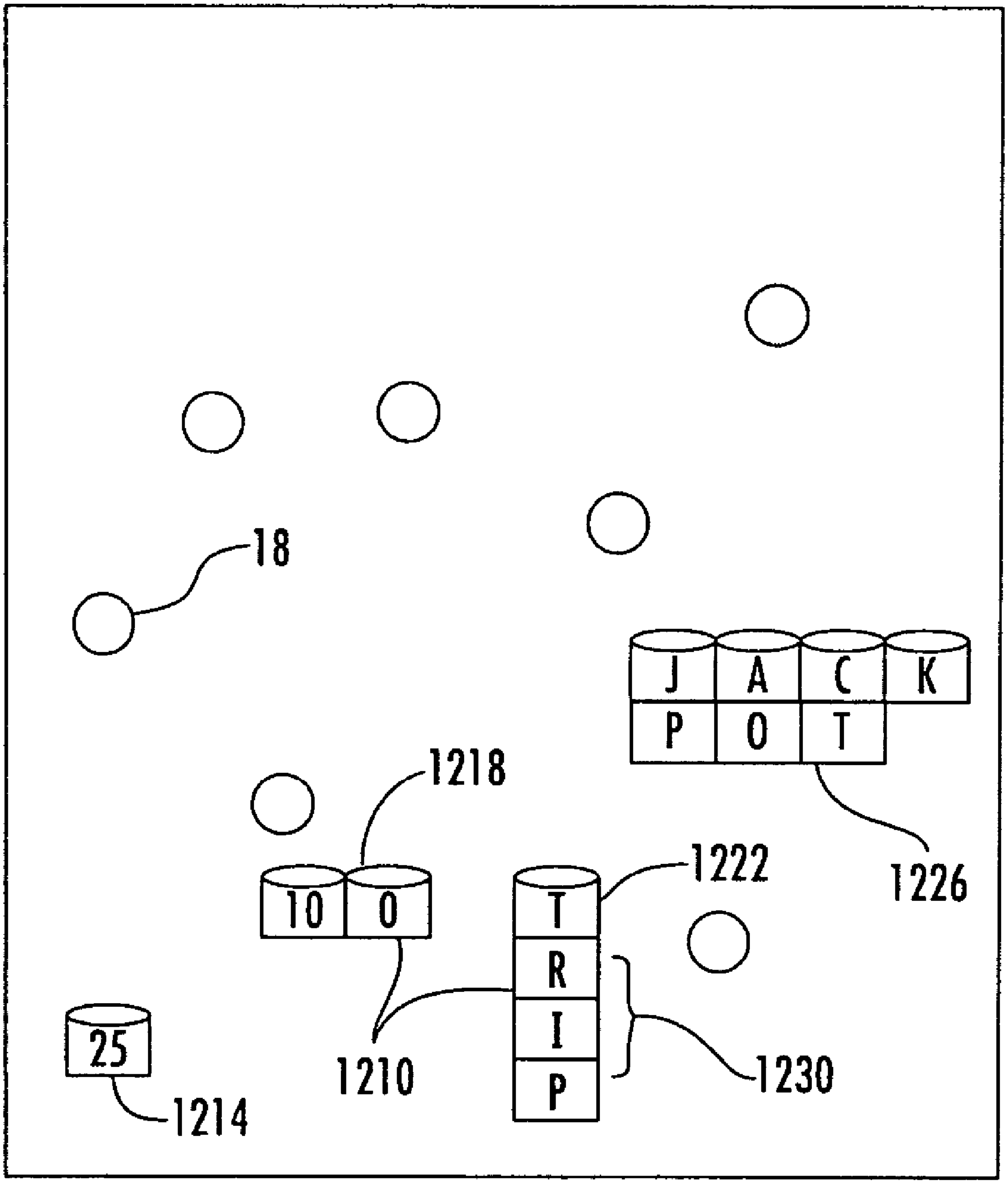
FIG. 12 is substantially a front view of a display device according to the present invention.

Another embodiment is illustrated in FIG. 12. FIG. 12 depicts a plurality of moveable objects 18 and a plurality of game elements 1210. Game elements 1210 may represent various prizes such as prize amounts 1214 and 1218, a vacation 1222, and jackpot prize 1226. It is understood that other prizes may be used.

During a game, moveable objects 18 may be selectively attracted to game elements 1210. Moveable objects 18 may be attracted to game element 1210 using suction, as previously described. Alternatively, moveable objects 18 may simply be agitated or placed in motion above game elements 1210, such that moveable objects 18 will occasionally enter the game elements on their own accord. The prize a player is awarded may be determined by which game element or elements 1210 moveable objects enter. For example, a game may end when one of game elements 1210 is filled by moveable objects 18. Game elements representing more valuable prizes, such as 1222, may contain more segments 1230, thereby making these prizes appear to players to be more difficult to win. In one embodiment, a prize is awarded when a plurality of segments of one game element, for example, segments of 1226, are filled with moveable objects before a segment of another game element, such as 1214, is filled with a moveable object. Alternatively, a game maybe configured to award multiple prizes. A game round may be timed, or the number of selected balls limited, in order to create more game variety and increase player excitement.

It is understood that various combinations, additions, subtractions, and substitutions can be made to the above described embodiments without departing from the scope of the present invention. For example, moveable objects 18 other than balls maybe used. In certain embodiments, only one moveable object 18 need be used.

Although the description above contains many specifications, these should not be construed as limiting the scope of the invention but as merely providing illustrations of various embodiments of this invention. The specification above, for instance, makes reference to bonus prizes. However, the present invention is not thereby intended to be limited to providing bonus prizes. Rather it is intended that the present invention can, in certain embodiments, be used independently as a stand-alone game without necessarily including, or functioning as, a bonus game. Thus, the scope of the invention should be determined by the claims as issued and their legal equivalents rather than by the examples given.

We claim:

1. A gaming device comprising:

(A) at least one game apparatus configured to allow a player to play a game;

(B) at least one moveable object;

(C) at least one container configured to hold the moveable object;

(D) at least one game elements coupled to the container and capable of receiving the moveable object;

(E) at least one actuator associated with the game element and configured to cause the moveable object to engage the game element; and (F) at least one controller in communication with the actuator and the game apparatus, configured to predetermined a random game outcome and, after the game controller randomly predetermines the game outcome, the game controller then activates the actuator to cause the moveable object to engage the game element, thereby conveying the random game outcome to the player, wherein the same controller is not necessarily in communication with both the actuator and the game apparatus when there is more than one controller.

2. The gaming device of claim 1 wherein the actuator is selected from the group consisting of a suction device and a magnet.

3. The gaming device of claim 2 wherein the suction device is selected from the group consisting of a vacuum pump, a fan and a vent.

4. The gaming device of claim 1 further comprising a valve interposed between the game element and the actuator.

5. The gaming device of claim 1 wherein the container is filled with a medium selected from the group consisting of air, carbon dioxide, water, inert oils and combinations thereof.

6. The gaming device of claim 1 wherein the game element is a receptacle in which the moveable object may be received.

7. The gaming device of claim 1 wherein the game element is configured to receive the moveable object on a surface of the game element.

8. The gaming device of claim 1 wherein the game element is associated with at least one game related indicium.

9. The gaming device of claim 1 further comprising a display housing surrounding the container.

10. The gaming device of claim 1 further comprising a plurality of moveable objects wherein the game element may receive the plurality of moveable objects.

11. The gaming device of claim 10 wherein the game element comprises a plurality of segments, each segment capable of receiving a moveable object.

12. The gaming device of claim 11 wherein each segment is associated with at least one game related indicium.

13. The gaming device of claim 1 wherein the moveable object is of a first-type, and the device further comprises an additional moveable object of a second-type.

14. The gaming device of claim 13 wherein the first-type and second-type moveable objects have different movement characteristics.

15. The gaming device of claim 13 wherein the first-type and second-type moveable objects are of different sizes.

16. The gaming device of claim 1 further comprising a gate in communication with the controller, the gate selectively limiting access to the game element.

17. The gaming device of claim 1 further comprising at least one barrier, wherein the moveable objects may strike and ricochet off of the barrier.

18. The gaming device of claim 1 further comprising a moveable object dispenser configured to release moveable objects above the game element.

19. The gaming device of claim 18 further comprising a moveable object return mechanism configured to transport moveable objects from a lower portion of the container to the moveable object dispenser.

20. The gaming device of claim 19 wherein the moveable object return mechanism is selected from the group consisting of conveyor belt, waterwheel, slide, funnel and auger mechanisms.

21. The gaming device of claim 1 further comprising a moveable object detector associated with the game element, in communication with the controller, and configured to determine when a moveable object has been received by the game element.

22. The gaming device of claim 21 wherein the moveable object detector is selected from the group consisting of an optical sensor, a bar code sensor, an inductive sensor and combinations thereof.

23. The gaming device of claim 1 further comprising a plurality of game elements wherein each game element is selectively actuatable by the controller in communication with the actuator.

24. A display device comprising:

(A) at least one moveable object;

(B) at least one container configured to hold the moveable object;

(C) a plurality of game elements attached to the container and capable of acquiring the moveable object;

(D) at least one actuator associated with the game element and configured to cause the moveable object to be acquired by the game element; and (E) at least one controller in communication with the actuator configured to predetermine a game outcome and after the game controller randomly predetermines the game outcome, the game controller then induces the actuator to cause the moveable object to be acquired by the game element in order to convey the game outcome to the player.

25. The display device of claim 24 wherein the actuator comprises a suction device selected from the group consisting of a vacuum pump, a fan and a vent.

26. The display device of claim 24 further comprising a plurality of game elements wherein each game element is selectively actuatable by the controller in communication with the actuator.

27. A method of playing a game comprising, but not all necessarily in order shown:

(A) allowing a player to place a wager and play a game;

(B) moving at least one moveable object located inside a container;

(C) randomly predetermining a game outcome by a game controller in communication with an actuator;

(D) after the game controller randomly predetermining the game outcome, then the game controller activating the actuator to cause the moveable object to be attracted to at least one game element as the moveable object moves inside the container in order to convey the game outcome to the player.

28. The method of claim 27 further comprising associating game related indicia with the game element, wherein the indicia communicate the game outcome.

29. The method of claim 27 further comprising dispensing moveable objects from a moveable object dispenser.

30. The method of claim 27 wherein step (D) comprises the actuator applying suction to the game element.

31. The method of claim 27 wherein step (D) further comprises attracting the moveable object to a plurality of game elements and varying association between the actuator and the game elements by use of the controller such that the plurality of game elements may be activated individually or simultaneously in order to cause the moveable object to be attracted to the game elements in varying degrees.

32. The method of claim 27 wherein step (D) further comprises attracting a plurality of moveable objects to a plurality of game elements wherein a first game element comprises a plurality of segments and a second game element comprises at least one segment.

33. The method of claim 32 further comprising awarding a prize to the player if the plurality of segments of the first game element are filled with moveable objects before the at least one segment of the second game element is filled with moveable objects.

34. The method of claim 27 comprising moving the moveable object, wherein the moveable object is one of a first-type of moveable object, and further comprising moving at least one of a second-type of moveable objects.

35. The method of claim 34 comprising moving the moveable objects, wherein the first-type and second-type moveable objects have different movement characteristics.

36. The method of claim 34 comprising moving the moveable objects, wherein the first-type and second-type moveable objects are of different sizes.

37. An apparatus for displaying an outcome of a game, comprising:

(A) at least one moveable object;

(B) at least one game element capable of receiving the moveable object;

(C) an actuator associated with the game element and configured to attract the moveable object to the game element; and (D) a game controller in communication with the actuator, the game controller configured to predetermine a random game outcome and, after the game controller predetermining the random game outcome, then the game controller activating the actuator to cause the actuator to attract the moveable object to the game element, thereby conveying the random game outcome for display.

38. The apparatus of claim 37 wherein the actuator is selected from the group consisting of a suction device and a magnet.

39. The apparatus of claim 38 wherein the suction device is selected from the group consisting of a vacuum pump, a fan and a vent.

40. A gaming device comprising:

(A) game apparatus means for enabling a player to play a game;

(B) moveable object means for indicating an outcome of the game;

(C) container means for holding the moveable object means;

(D) a plurality of game element means for receiving the moveable object means;

(E) moveable object attracting means for associating the moveable object means with the game element means, and;

(F) controller means for predetermining the outcome of the game and the game controller means in communication with the moveable object attracting means, after the game controller means randomly predetermines the game outcome, the game controller mean then selecting the game element means, and then the controller means activates the moveable object attracting means associated with the selected game element means to cause the moveable object means to be attracted to the game element means selected to convey the outcome of the game.

41. The gaming device of claim 40 further comprising a plurality of game element means.

* * * * *